United States Patent

[11] 3,602,897

[72] Inventors John J. Igel
Rochester;
Myron D. Schettl, Oronoco, both of, Minn.
[21] Appl. No. 838,969
[22] Filed July 3, 1969
[45] Patented Aug. 31, 1971
[73] Assignee International Business Machines
Corporation
Armonk, N.Y.

[54] KEY-ENTRY SYSTEM
21 Claims, 8 Drawing Figs.

[52] U.S. Cl. .......... 340/172.5
[51] Int. Cl. .......... G06f 11/00, G06f 11/10
[50] Field of Search .......... 340/172.5; 235/157

[56] References Cited

UNITED STATES PATENTS

| | | | |
|---|---|---|---|
| 2,688,656 | 9/1954 | Wright et al. | 340/172.5 |
| 3,187,321 | 6/1965 | Kameny | 340/172.5 |
| 3,241,120 | 3/1966 | Amdahl | 340/172.5 |
| 3,289,176 | 11/1966 | Garth, Jr. et al. | 340/172.5 |
| 3,310,787 | 3/1967 | Welsh et al. | 340/172.5 |
| 3,341,819 | 9/1967 | Emerson | 340/172.5 |
| 3,360,781 | 12/1967 | Boehnke | 340/172.5 |
| 3,380,033 | 4/1968 | Cerny | 340/172.5 |
| 3,403,225 | 9/1968 | Mislan et al. | 340/172.5 |
| 3,487,369 | 12/1969 | King et al. | 340/172.5 |

*Primary Examiner*—Gareth D. Shaw
*Attorneys*—Hanifin and Jancin and Keith T. Bleuer

ABSTRACT: A system of the type capable of entering data in successive positions in a circulating data storage unit by successive actuation of data keys and including overcontrol mechanism operative to effectively erase the data provided in the circulating storage unit by the last actuated data key or selectively to erase back to the beginning of a field determined by program control or selectively to erase back to a space between separate words in the circulating data.

INVENTORS
JOHN J. IGEL
MYRON D. SCHETTL
BY
Keith T. Bleuer
ATTORNEY

KEY-ENTRY SYSTEM

BACKGROUND OF THE INVENTION

The invention relates to key-operated data entry systems such as those that may, for example, be used for punching document cards.

Prior punches of this type, in general, are so constructed that punching occurs as each data key is actuated. Therefore, if a mistake is made, the document card has been erroneously punched; and, therefore, another card must be substituted for it in which the punching may be done correctly.

SUMMARY OF THE INVENTION

It is an object of the present invention to provide a key-operated data entry system, which may, for example, be used for punching document cards and including a storage, preferably of the circulating magnetostrictive delay line type, for receiving data in accordance with successive data keys that are actuated by the operator. The data so stored may be used for later punching after all of the data has been entered into storage for a complete document card.

More particularly, it is an object of the invention to provide means for effectively backspacing, that is, for rendering ineffective or erasing, in effect, the data in storage provided therein by the actuation of a particular data key so that if the wrong data key is used, the correct data key may be actuated to correct the data in storage; and it is also an object of the invention to provide means for selectively rendering ineffective a plurality of successive characters entered into storage by actuation of a plurality of data keys.

A preferred embodiment of the system according to the teachings of the invention includes a so-called field erase key on the keyboard which, when actuated, causes the effective erasing of data entered by a prior stroke of a data key on the keyboard. The system is preferably under program control, such as, for example, to allow skipping or duping of data in circulating storage; and when under program control, the system is effective for providing the effective erasing of a plurality of successive characters entered into storage, utilizing the field erase key. In one case, the field erase key may be utilized for erasing back to the beginning of a field defined by the program and constituting a part of a complete record (the complete data for an entire document card, for example). Alternately, using another actuatable key on the keyboard, the field erase key may be effective for erasing only back to a space just prior to the first significant character entered in storage.

DESCRIPTION OF THE PREFERRED EMBODIMENT

Figures 4, 4D:
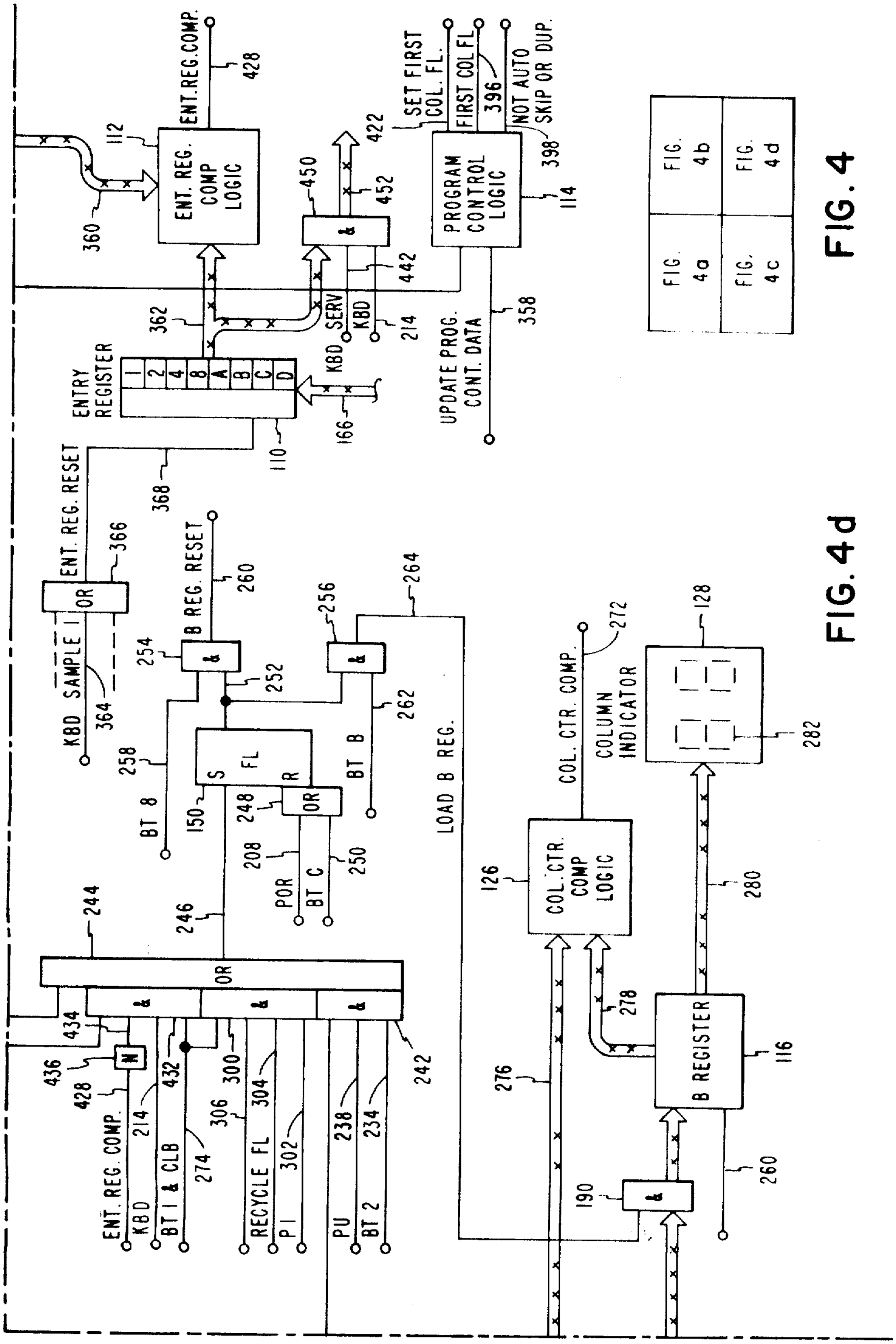
FIG. 4 is a diagram showing the manner in which FIGS. 4*a*, 4*b*, 4*c*, and 4*d* may be combined to form a complete figure.
Figure 4A:
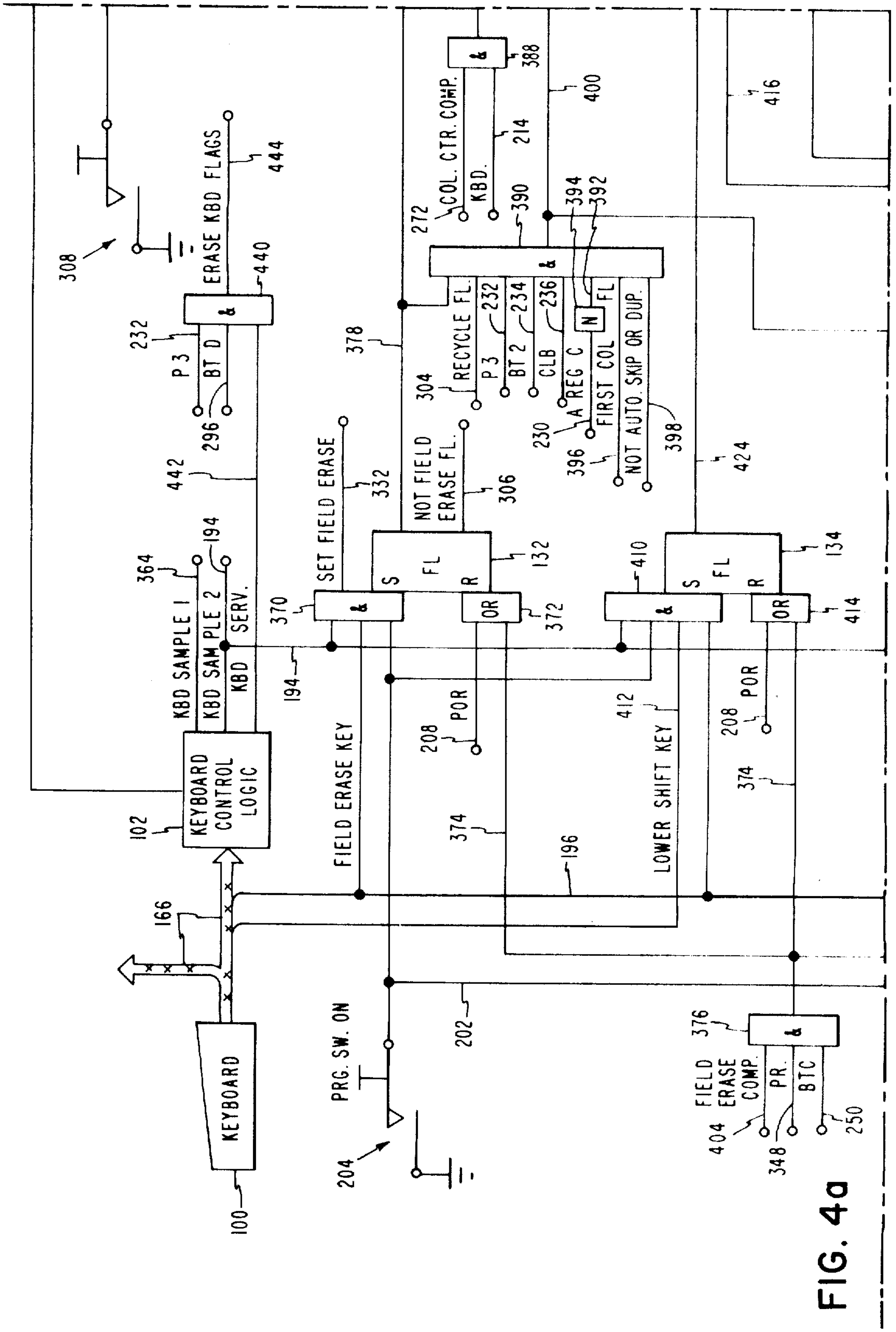
Figure 4B:
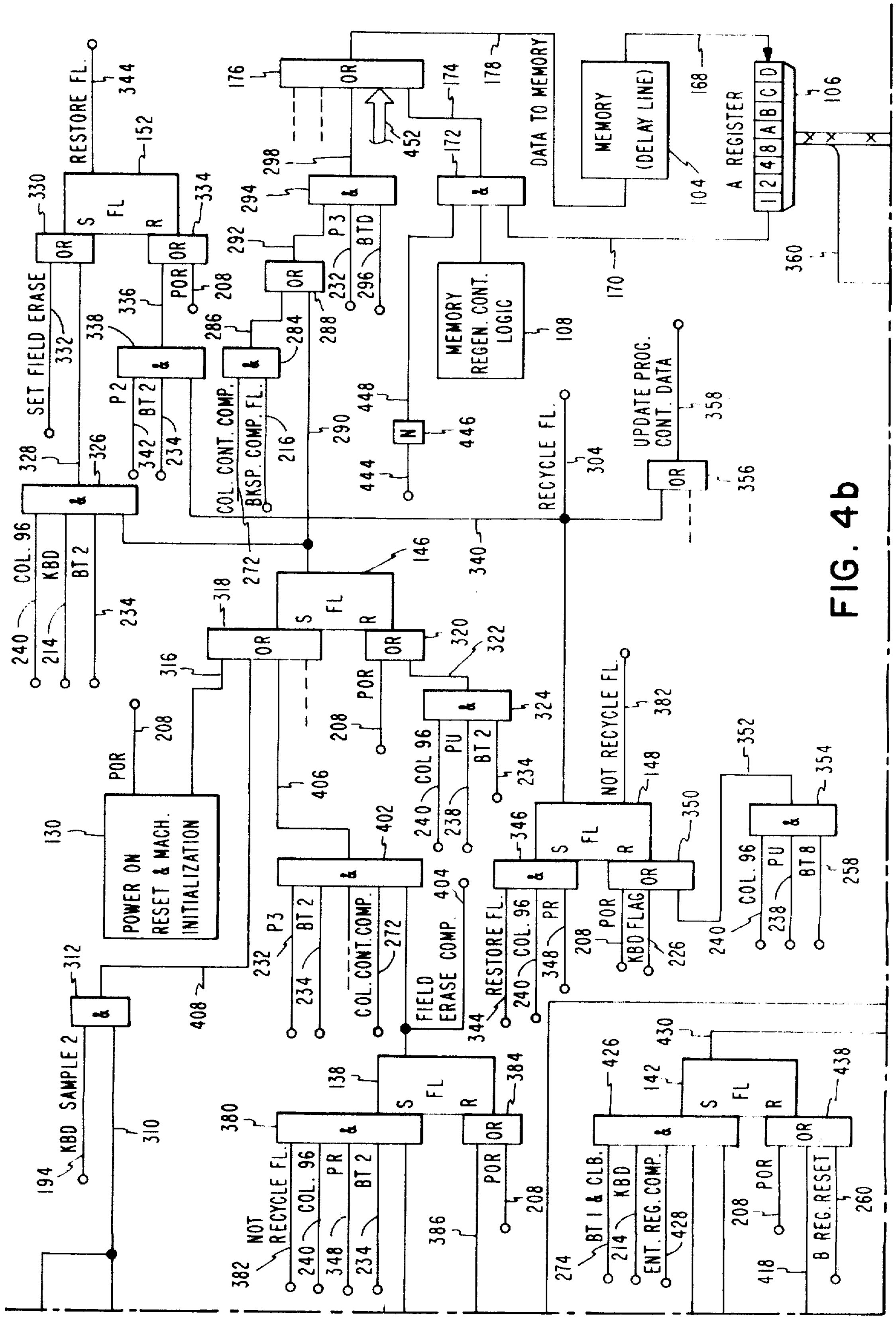
Figure 4C:
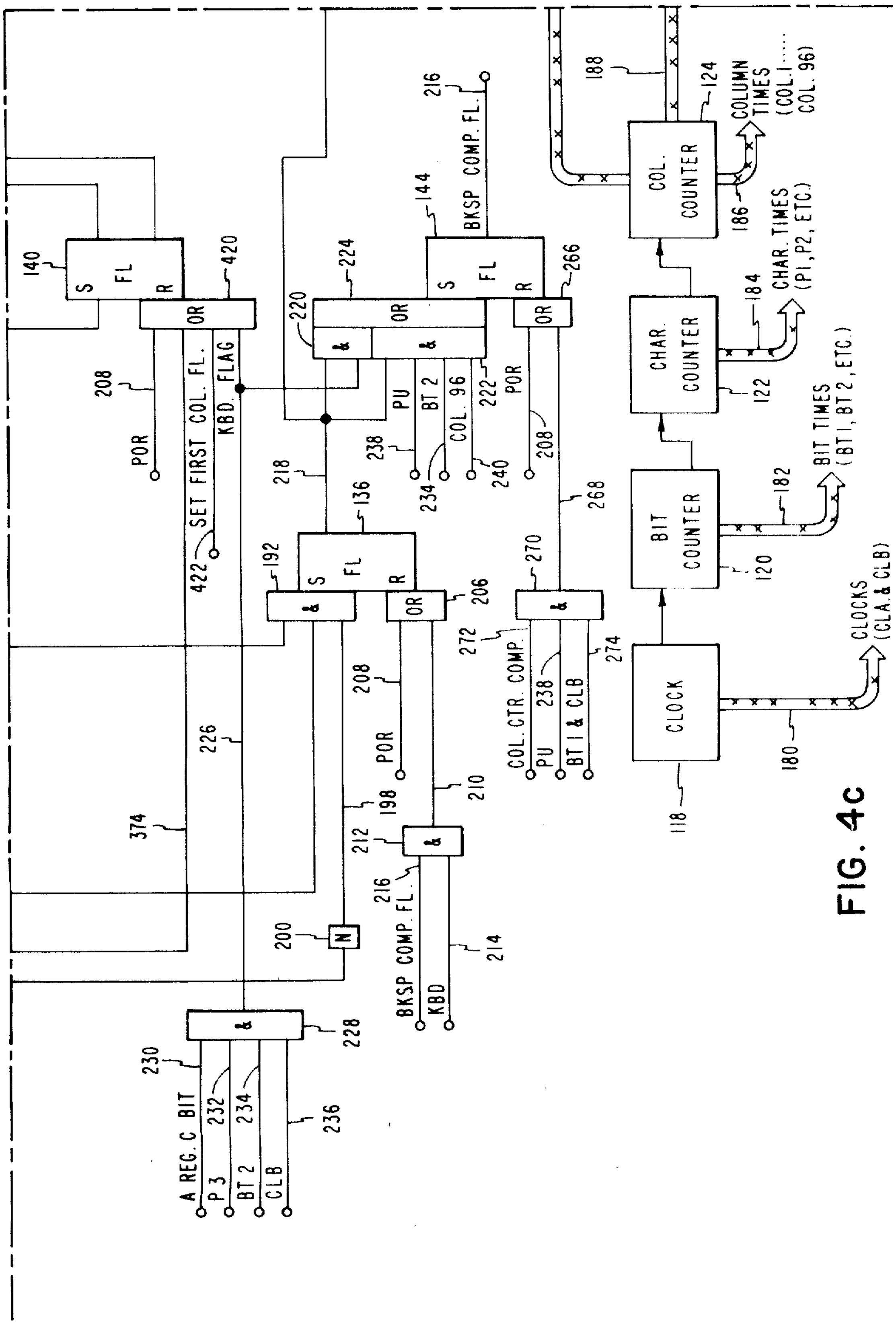

Referring now to FIG. 4, the control system for the key-entry machine, which may, for example, be a keypunch for punching holes into document cards and for subsequently printing corresponding alphanumeric characters onto the cards, may be seen to comprise, in general, a keyboard 100, keyboard control logic 102, a data storage or memory unit 104, an A register 106, memory regeneration control logic 108, an entry register 110, entry register compare logic 112, program control logic 114, a B register 116, a clock 118, a bit counter 120, a character counter 122, a column counter 124, column counter compare logic 126, a column indicator 128, power on reset and machine initialization logic 130, latches 132, 134, 136, 138, 140, 142, 144, 146, 148, 150, and 152 together with other circuitry such as AND and OR gates connected with the logic blocks and also with the latches.

Figure 1:
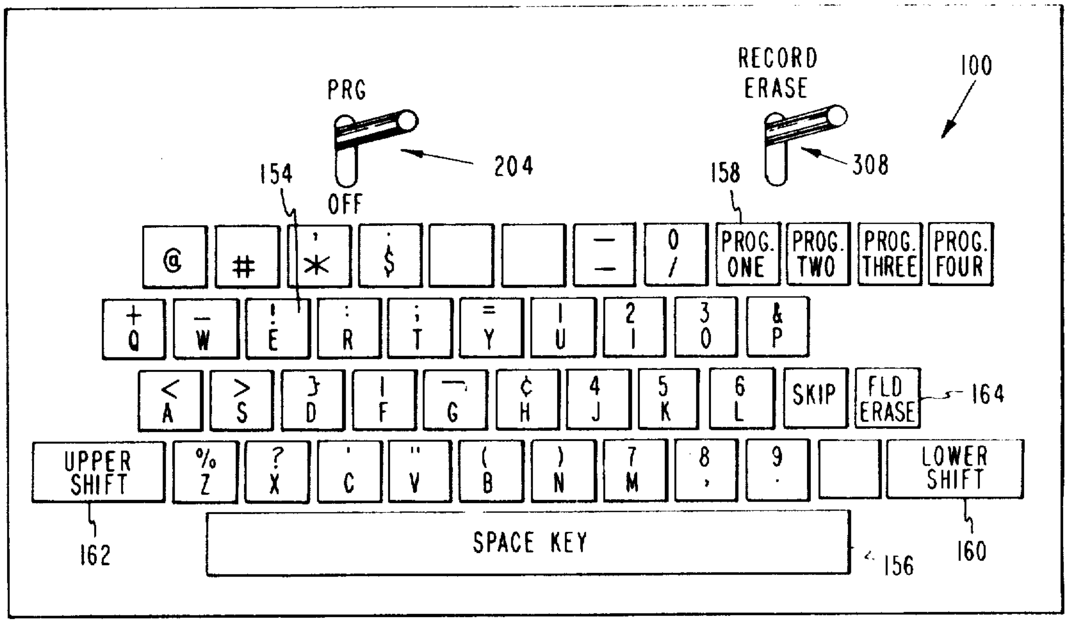
FIG. 1 is a plan view of a keyboard that may be used with the data entry system of the invention.

Referring to FIG. 1, the keyboard 100 has a plurality of data keys 154, a space key 156, a plurality of program keys 158, a lower shift key 160, an upper shift key 162, and a field erase key 164. The keyboard 100 is connected with the entry register 110 by a buss 166 for the transfer of data from the keyboard 100 to the entry register 110.

The data storage unit 104 may, for example, constitute a magnetostrictive delay line which is adapted to have data bits passing through it from one end to the other. The storage unit 104 is connected by a lead 168 with the A register 106, and the A register 106 is connected by means of a lead 170 with a logical AND circuit 172. The output side of the AND circuit 172 is connected by means of a lead 174 with a logical OR circuit 176, and the output side of the OR circuit 176 is connected by means of a lead 178 with storage 104. The storage 104, the A register 106, which is a shift register made up of a series of triggers, the AND circuit 172, and the OR circuit 176 constitute a closed loop through which data bits may circulate; and the circulation is controlled by clock 118 which is effective through memory regeneration control logic 108 to maintain the bits circulating within this loop at a certain frequency or speed.

Figure 2:
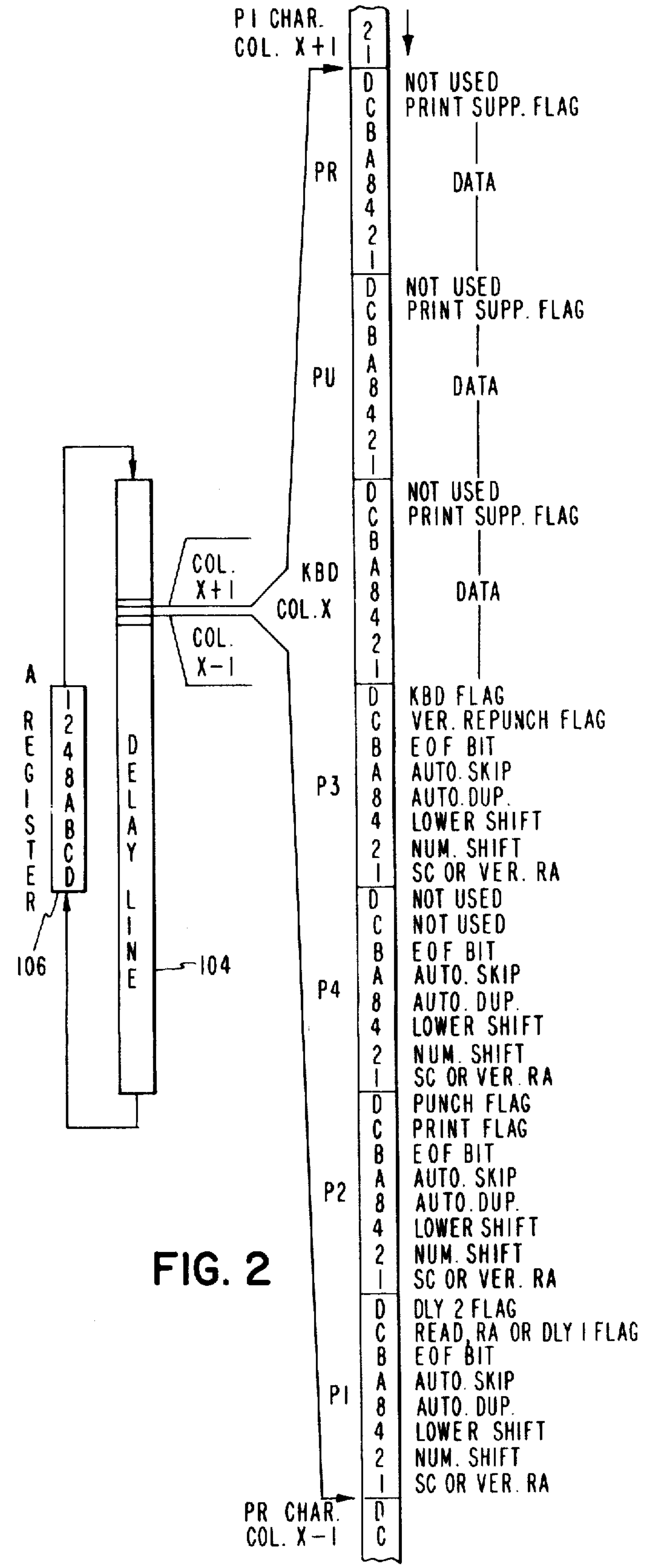
FIG. 2 is a diagrammatic view of the characters circulating through the storage unit of the system.

The data circulating through storage 104 and A register 106 may, for example, be in the form shown in FIG. 2 and may consist of 96 columns each of which has P1, P2, P4, P3, KBD, PU, and PR characters. Each of these characters, in turn, may be made up of bits 1, 2, 4, 8, A, B, C, and D. Each of the characters may, for example, have a duration of 8 microseconds; and, therefore, each of the bits may have a duration of 1 microsecond as the bits and characters pass any one point in the loop of storage 104.

The keyboard 100 includes suitable encoding logic so as to provide certain bits 1, 2, 4, 8, A, and B with raised values for each of the characters on the data keys 154. When the lower shift key 160 is actuated, the particular bits corresponding to the lower characters on each of the data keys 154 are raised while if the upper shift key 162 is actuated, the data bits corresponding to the upper characters on the data keys 154 are raised. These particular bits are transferred from the keyboard 100 into the entry register 110 and from thence into storage 104 to circulate in the loop of storage 104, A register 106, AND circuit 172, and OR circuit 176. For each actuation of a data key 154, the bits 1, 2, 4, 8, A, and B in the KBD character for column 1 and succeeding columns circulating in storage 104 may be used; and for certain purposes such as for punching out these bits or for printing out these bits, these bits may be transferred from the KBD characters to the PU characters and to the PR characters circulating through storage 104, using any suitable circuitry.

The P1, P2, P4, and P3 characters for each of the columns circulating through storage 104 may be used for program control such as, for example, to indicate the end of a field (the B bit of characters P1, P2, P4, and P3) or to indicate auto skip, auto dup, alpha shift, numeric shift, etc., as shown in FIG. 2. This program data may be entered into the loop including storage 104 and shift register 106 by any suitable circuitry.

Figure 3:
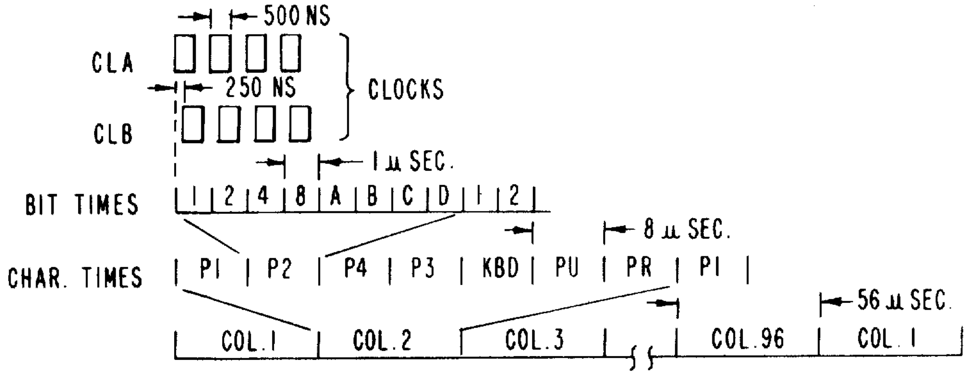
FIG. 3 is a diagram showing the timing or clocking signals utilized by the system.

The system, particularly storage 104 and A register 106, is under the control of clock 118 which has an output 180 indicating clock times A and B (see FIG. 3). Bit counter 120 is connected with clock 118 and has an output 182 indicating the various bit times, bit times 1, 2, 4, 8, A, B, C, and D. Character counter 122 is connected with bit counter 120 and has an output 184 indicating the various character times, P1, P2, P4, P3, KBD, PU, and PR. The column counter 124 has an output 186 indicating the various column times, column 1, column 2, column 3 ... column 96. The B register 116 is in substance a register which stores the particular column address into which data is about to be entered by actuation of one of the data keys 154. The B register is connected by buss 188 with column counter 124, and AND circuit 190 is provided in the buss 188.

The system includes circuitry for backspacing which will hereinafter be described in greater detail, and this circuitry is based on the backspace latch 136. An AND circuit 192 is provided on the set side of the latch 136; and the AND circuit 192 has three inputs provided respectively by leads 194, 196, and 198. The lead 198 is connected with an inverter 200 which, in turn, is connected to a lead 202. The lead 202 is connected with a program switch 204 which is preferably located separate from the keyboard 100, such as in a position above the keyboard. The lead 196 is connected with the keyboard 100 and has a signal supplied to it when the field erase key 164 is actuated. The lead 194 is connected with keyboard control logic 102 which is so arranged that a pulse at bit time 4 is provided upon actuation of one of the keys 154, 156, or 158, this signal being designated as "keyboard sample 2."

An OR circuit 206 is provided on the reset side of the latch 136; and this OR circuit has two inputs, namely, lead 208 and lead 210. The lead 208 also constitutes an output of the power on reset and machine initialization logic 130, and this logic is so arranged that a pulse of 500 milliseconds is provided on the lead 208 when power is initially switched on to the machine. The lead 210 is connected with an AND circuit 212 having inputs from leads 214 and 216. The lead 214 has "KBD" signal applied onto it which is a pulse for 8 microseconds occurring each time that this character is generated in the various column times as developed by the character counter 122.

The latch 136 has its output connected by a lead 218 to AND circuits 220 and 222. The AND circuits 220 and 222 are appended on an OR circuit 224 on the set side of the latch 144 which may be termed a backspace compare latch.

The AND circuit 220 has two inputs, one of which is the lead 218 and the other of which is a lead 226 constituting the output of an AND circuit 228. The AND circuit 228 has four inputs, namely, leads 230, 232, 234, and 236. The lead 230 has the signal "A REG C bit" thereon which is derived from the A register 106 and constitutes the particular bit that is in the C position of register 106. The leads 232, 234, and 236 respectively have pulses at P3, bit time 2, and clock B impressed thereon respectively from counters 122 and 120 and clock 118.

The AND circuit 222 has four inputs one of which constitutes the lead 218 and the other three of which constitute leads 238, 234, and 240. The leads 238 and 240 have the timing signals "PU" and "column 96" respectively thereon derived from the character counter 122 and the column counter 124. The line 234 carries the "bit time 2" signal as previously mentioned.

The lead 218 constitutes an input to an AND circuit 242 that, in turn, is applied onto an OR circuit 244. The AND circuit 242 has three inputs including the lead 218, the "PU" signal carrying lead 238, and the "bit time 2" signal carrying lead 234. The OR circuit 244 has its output in the form of a lead 246 connecting the OR circuit with the load B REG latch 150. The lead 246 from the OR circuit 244 is connected to the latch 150 on its set side, and an OR circuit 248 is on the reset side of the latch 150. The OR circuit 248 has two inputs, namely, a lead 250 carrying the "bit time C" signal derived from the bit counter 120 and the lead 208 carrying the "POR" signal.

The output side of the latch 150 is connected by means of a lead 252 with two AND circuits 254 and 256. The AND circuit 254, in addition to the lead 252, has an input from lead 258 which carries a "bit time 8" signal derived from the bit counter 120. The output of the AND circuit 254 constitutes the lead 260 carrying the "B REG reset" signal applied onto the B register 116. The AND circuit 256 has two inputs, one of which is the lead 252; and the second input to the AND circuit 256 is the lead 262 which carries the timed signal "bit time B." The output of the AND circuit 256 is connected by means of lead 264 with the B register 116 and provides the signal "load B REG" on this lead.

The backspace compare latch 144 has an OR circuit 266 on its reset side; and the OR circuit has two inputs, namely, from POR lead 208 and from lead 268. The lead 268 is connected with an AND circuit 270; and the AND circuit 270 has three inputs, namely, from lead 272 carrying a signal "column counter compare," lead 238 carrying the signal "PU," and a lead 274 carrying a signal "bit time 1 & clock B." The signal on lead 274 is derived from the bit counter 120 and the clock 118 at the correspondence of bit time 1 and clock B times. The backspace compare latch 144 has its output in the form of lead 216 (previously described as an input to the AND circuit 212) and carrying a signal "backspace compare latch."

The column counter 124 and the B register 116 are connected by means of leads 276 and 278 with the logic block 126 (column counter compare logic); and the logic block 126 has its output in the form of lead 272 which, as previously described, is one of the inputs to AND circuit 270. The B register 116 is connected by means of lead 280 with the indicator 128 which may be of the type having a plurality of bars 282 that light to indicate visually the column number which is stored in the B register 116.

The lead 272 constitutes one of the two inputs to an AND circuit 284, and the other input to the AND circuit 284 is the lead 216 which carries a signal "backspace compare latch." The AND circuit 284 is connected by a lead 286 with an OR circuit 288. The OR circuit 288, in addition to the input from lead 286, has another input from a lead 290 which will subsequently be discussed in greater detail. The OR circuit 288 has its output connected by means of a lead 292 with an AND circuit 294. The AND circuit 294 has three inputs, and two of these are respectively the "P3" signal carrying lead 232 and a lead 296. The lead 296 carries a "bit time D" signal derived from the bit counter 120. The AND circuit 294 has its output connected by means of a lead 298 with the OR circuit 176.

An AND circuit 300 is also applied onto the OR circuit 244, and AND circuit 300 has four inputs. The lead 274 carrying the signal "bit time 1 & clock B" constitutes one of the inputs for the AND circuit 300. A lead 302, which carries the signal "P1" derived from the character counter 122, and leads 304 and 306 constitute the other inputs for the AND circuit 300.

The record erase function utilizes the switch 308 connected by means of the lead 310 with an AND circuit 312. The lead 310 constitutes one of the two inputs of the AND circuit 312, and this lead is also connected to the keyboard control logic 102. The other input to the AND circuit 312 is provided by the lead 194 that carries a "keyboard sample 2" signal. "-Keyboard sample 2" signal is a pulse that occurs at bit time 2 and is provided upon actuation of one of the keys 154, 156, or 158. The AND circuit 312 is connected by means of a lead 316 with an OR circuit 318. The OR circuit 318 is provided on the set side of the latch 146 which may be termed a write keyboard flags latch.

An OR circuit 320 is applied on the reset side of the latch 146 and is connected by means of a lead 322 with an AND circuit 324. The OR circuit 320 also has the "POR" signal lead 208 as an input. The AND circuit 324 has three inputs including leads 240, 238, and 234 which respectively have the 'column 96," "PU," and "bit time 2" signals thereon.

The latch 146 has its output in the form of lead 290 which constitutes an input to an AND circuit 326. The AND circuit 326 has four inputs; and three of these are leads 240, 214, and 234 respectively carrying the "column 96," "KBD," and "bit time 2" signals. The AND circuit 326 has its output in the form of a lead 328 which constitutes an input to an OR circuit 330 appended to the restore latch 152 on its set side. The OR circuit 330 has two inputs, one of which is the lead 328 and the other of which is a lead 332.

The reset side of the latch 152 has an OR circuit 334 applied thereto; and the OR circuit 334 has two inputs, one of which is the POR lead 208 and the other of which is the lead 336. The lead 336 constitutes the output of an AND circuit 338. The AND circuit 338 has three inputs, one of which is a lead 340 and the others of which are a lead 342 carrying the signal "P2" derived from the character counter 122 and lead 234 carrying the "bit time 2" pulse.

The output of the latch 152 constitutes a lead 344 which is one of the inputs to an AND circuit 346 on the set side of the latch 148 which may be termed a recycle latch. The other two inputs to the AND circuit 346 are the lead 240 carrying the "-column 96" signal and a lead 348 carrying a "PR" signal which is derived from the character counter 122.

An OR circuit 350 is on the reset side of the latch 148; and the OR circuit 350 has three inputs, namely, a lead 352, the POR lead 208, and the keyboard flag lead 226. The lead 352 constitutes the output of an AND circuit 354; and the AND circuit 354 has three inputs, namely, lead 240 carrying the "-column 96" signal, lead 238 carrying the "PU" signal, and a lead 258. The lead 258 carries a "bit time 8" signal derived from the bit counter 120.

The lead 304, which at times carries a signal "recycle latch," is connected to an OR circuit 356; and the OR circuit 356 has its output in the form of a lead 358 connected with the program control logic 114. The A register is connected by means of a buss 360 with the entry register compare logic 112 and with the program control logic 114. The entry register 110 is connected by means of a buss 362 with the entry register compare logic 112; and the entry register 110 is connected with the keyboard control logic 102 by means of a lead 364, an OR circuit 366, and a lead 368. The lead 364 has a signal "-keyboard sample 1" thereon which is a signal occurring at bit time 2, P1, column 1, when one of the keys 154, 156, and 158 are depressed.

The field erase function is provided by the field erase latch 132, and the latch 132 has an AND circuit 370 on its set side. The AND circuit 370 has three inputs which are leads 194, 196, and 202 respectively provided with the "keyboard sample 2," "field erase key," and "PR," on" signals. An 2." 372 is provided on the reset side of the field erase latch 132; and the OR circuit 372 has two inputs, namely, the lead 208 carrying the "POR" signal and the lead 374 constituting the output of AND CIRCUIT 0&'. The field erase latch 132 has two outputs, namely, the dead 378 which carries the signal "field erase latch" and the lead 306 which is connected to the AND circuit 300 and carries the "not field erase latch" signal.

The field erase compare latch 138 has an AND circuit 380 on its set side; and this AND circuit 380 has five inputs, one of which is the lead 378. The other inputs to the AND circuit 380 include the leads 240, 348, and 234 which respectively carry the signals "column 96", "PR", and "bit time 2". The other input to the AND circuit 380 is provided by a lead 382 carrying the signal "not recycle latch" derived from the latch 148.

An OR circuit 384 is provided on the reset side of the field erase compare latch 138, and the OR circuit 384 has two inputs. The lead 208 carrying the "POR" signal constitutes one of the inputs to the OR circuit 384, and the other input is provided by a lead 386. The lead 386 constitutes the output of an AND circuit 388, and the AND circuit 388 has two inputs. One of these inputs is provided by the lead 214 carrying the "KBD" signal, and the other is provided by the lead 272 carrying the signal "column counter compare."

An AND circuit 390 has eight inputs, one of which is the "-field erase latch" signal from the lead 378. Four of the inputs to the AND circuit 390 are from the previously mentioned leads 304, 232, 234, and 236 carrying respectively the signals "recycle latch," "P3," "bit time 2," and "clock B." Another of the inputs is a lead 392 carrying a signal "not A REG C" derived from an inverter 394 connected to the lead 230 carrying the signal "A REG C." The seventh input to the AND circuit 390 is a lead 396 carrying the signal "first column latch," and the eighth input to the AND circuit is a lead 398 carrying the signal "not auto skip or dup," both of which are derived from the program control logic 114. A lead 400 constitutes the output of the AND circuit 390, and this lead is connected as an input to OR circuit 244.

The lead 272 from the column counter compare logic 126 constitutes one of the inputs of an AND circuit 402. The AND circuit 402 has four inputs. Two of these inputs are the leads 232 and 234 respectively carrying the signals "P3" and "bit time 2," and the other input is a lead 404 constituting the output of the field erase compare latch 138 and carrying the signal "field erase compare." The AND circuit 402 is connected by means of a lead 406 with the OR circuit 318. The OR circuit 318 has three inputs including leads 316 and 406 and a third lead 408 connected with the AND circuit 312.

The word erase function utilizes the word erase latch 134. The latch 134 has an AND circuit 410 at its set side, and the AND circuit has four inputs. One of these inputs is provided by the lead 194 carrying the "keyboard sample 2" signal; another of the inputs is provided by lead 202 carrying a signal when the program switch 204 is closed; a third input is provided by the lead 196 carrying a signal when the field erase key 164 is actuated; and the fourth input is provided by a lead 412. The lead 412 is connected with the keyboard 100 and has a signal provided thereon when the lower shift key 160 is actuated.

An OR circuit 414 is provided on the reset side of the latch 134. The OR circuit 414 has two inputs, one of which is the lead 208 carrying the "power on reset" signal and the other of which is the lead 374 constituting the output of the AND circuit 376. The AND circuit 376 has three inputs, one of which is the lead 404 carrying the signal "field erase compare", another of which is the lead 348 carrying the "PR" signal, and the third of which is the lead 250 carrying the "bit time C" signal.

Lead 400 is connected to the set side of the word erase field latch 140. The word erase field latch 140 has two outputs, namely, the lead 416 carrying the signal "word erase field latch" and the lead 418 carrying the signal "not word erase field latch". The word erase field latch 140 has an OR circuit 420 on its reset side, and the OR circuit 420 has four inputs. Three of these inputs are respectively the lead 208 carrying the "POR" signal, the lead 374, and the lead 226 carrying the "KBD flag" signal. The fourth input to the OR circuit 420 is a lead 422 carrying the signal "set first column latch" which is derived from the program control logic 114 and is provided just before the system enters a new field.

A lead 424 constitutes the output of the latch 134, and lead 424 is connected to be one of the five inputs to an AND circuit 426 disposed on the set side of the word erase space latch 142. The inputs to the AND circuit 426 include, in addition to lead 424, lead 274 carrying the signal "bit time 1 & clock B", the lead 214 carrying the "KBD" signal, a lead 428 carrying a signal "entry register compare" which is derived from the entry register compare logic 112, and the lead 416. The output of the word erase space latch 142 is connected by means of a lead 430 with an AND circuit 432 which is appended on the OR circuit 244.

The AND circuit 432 has inputs from leads 430 214, and 274 in addition to a lead 434. The lead 274 carries the signal "bit time 1 & clock B," and the lead 214 carries the "KBD" signal. The lead 434 carries a signal "not entry register compare"; and lead 434 is connected to an inverter 436 which, in turn, is connected to lead 428 carrying the signal "entry register compare."

An OR circuit 438 is provided on the reset side of the word erase space latch 142, and OR circuit 438 has three inputs. One of these inputs is the lead 208 carrying the "POR" signal; another of the inputs is lead 260 carrying the signal "B register reset"; and the third input is the lead 418.

Circuitry is provided for erasing keyboard flags on a depression of any of the data keys 154 or the space key 156, and this circuitry comprises the AND circuit 440. The AND circuit 440 has three inputs, namely, from leads 232, 296, and 442. The leads 232 and 296 carry the timing signals "P3" and "bit time D," respectively; and the keyboard control logic 102 is of such construction as to provide a "keyboard service" signal on lead 442 on a depression of the space key 156 or any of the data keys 154. The output of the AND circuit 440 is a lead 444 having a signal "erase keyboard flags" thereon when the AND circuit 440 is satisfied; and this lead is connected to an inverter 446 that is, in turn, connected by means of a lead 448 to AND circuit 172.

Data is transferred from the entry register 110 to the circulating data system including storage 104 by means of AND circuit 450 connected to buss 362. The AND circuit 450 also has the leads 442 and 214 applied thereto as inputs carrying respectively the "keyboard service" signal and the timed "KBD" signal. The AND circuit 450 has buss 452 as an output that constitutes an input to OR circuit 176.

When the machine is initially supplied with power, the power on reset and machine initialization logic 130 provides a "POR" signal on lead 208 and a "machine initialization" signal on lead 316. The "POR" signal on lead 208 is supplied to all of the latches in the system for the purpose of resetting the latches, if necessary. The "POR" signal is supplied to the latches through OR circuits 372, 414, 206, 420, 266, 384, 438, 320, 350, 334, and 248.

The "machine initialization" signal on the lead 316 is effective by means of OR circuit 318 to set the write keyboard flags latch 146, and this latch provides a signal on lead 290 applied through OR circuit 288 and AND circuit 294 for writing keyboard flags in data that circulates through storage 104 and A register 106. The time signals "P3" and "bit time D" are also applied on the AND circuit 294 so that the AND circuit 294 is effective to provide a bit D in each character P3 acting as a keyboard flag for each column of data circulating through storage 104 and A register 106.

In the operation of the system, data circulates from storage 104 through the A register 106 and from thence through AND circuit 172 to OR circuit 176. The data is in the form shown in FIG. 2, and there is a keyboard flag provided in the D bit of the character P3 for each of the 96 columns as above described. The other bits, such as, for example, the end of field bits in the B bit position in the various program characters P1, P2, P4, and P3, may be provided by any suitable means. Data from the keyboard resulting from the depression of any of the data keys 154 and the space key 156 is supplied to the entry register through the buss 166; and this data, as each of these keys is depressed, is stored in the entry register 110. This data is then transferred by means of buss 362, AND circuit 450, buss 452, and OR circuit 176 to lead 178, so that the data for each depression of a key is entered into the particular column in effect when the key is depressed and is entered particularly in the keyboard section of the data circulating through storage 104 and the A register 106. In particular, the data resulting from a depression of any of the data keys 154 when column 1 is in effect will be entered into the keyboard character of column 1 circulating through storage 104 and A register 106.

The keyboard 100 includes encoding logic (not shown) so that for each of the data keys 154 different bits are encoded and are then transferred to the keyboard character for the particular column in which the machine is operating; and the bits encoded will be different for the various data keys 154, depending on whether the lower shift key 160 or the upper shift key 162 is depressed. For example, when the upper shift key 162 is depressed, the data key having the numerical "1" thereon is effective; and a single bit will be provided in the keyboard character for the column at the bit 1 position. As another example, when the data key having the numeral "5" thereon is depressed, with the upper shift key 162 still being effective, the bits in the 4 and 1 position will be provided in the keyboard character for the particular column. As indicated in FIG. 2, the bit positions 1, 2, 4, 8, A, and B in the KBD, PU, and PR characters, are utilized for the data so encoded by depression of the data keys 154; and the other bit positions are used for other purposes. The encoding logic included in the keyboard 100 is preferably such that none of the bits 1, 2, 4, 8, A, and B is raised when the space key 156 is actuated, and all of the bit positions are blank.

Just prior to the time that the data is entered into the keyboard character of column 1 as just described, the AND circuit 440 is effective for erasing the keyboard flag in the bit D position of the P3 character for column 1. The "keyboard service" signal is supplied by keyboard control logic 102 in the lead 442 on depression of the data key; and at P3, bit time D, the signal "erase keyboard flag" is provided on lead 444. At this time, the inverter 446 is effective to discontinue the signal supplied by the inverter 446 to the AND circuit 172 so as to disable the AND circuit 172 and erase the keyboard flag in the bit D position in the P3 character for column 1. Likewise, other characters are entered into the other columns of data circulating through storage 104 as additional data keys 154 or the space key 156 are depressed; and, again for each column of data entered, the keyboard flag in that column is erased.

Program data from the program control logic 114 may be transmitted onto additional latches, circuitry, and mechanical devices (not shown) for rendering operative the particular program that is in effect at any particular time depending on which of the program keys 158 was actuated.

When the operator desires to provide a single column backspace, the field erase key 164 is depressed with the program switch 204 being open. Under these conditions, the three inputs to the AND circuit 192 are provided to set the backspace latch 136. The lead 198 has a signal on it due to the inverter 200 connected with the program switch 204 by means of lead 202 to provide one of the inputs. The field erase key 164 being depressed provides a signal in the second input lead 196, and the signal "keyboard sample 2" provides the third input in the lead 194. The "keyboard sample 2" pulse occurs only once per each key depression, namely, at column 1, P1, bit time 4. Therefore, the backspace latch is set at column 1 time and is effective for its intended purposes at column 1 time.

With the backspace latch 136 being set, the system proceeds to scan storage 104 and the A register 106 as the 96 columns circulate through storage 104 and A register 106 and scans particularly for the first keyboard flag following column 1. This scanning is done particularly by the AND circuit 228 having the input A REG C bit and the timing signals "P3," "bit time 2," and "clock B." If a keyboard flag exists in any column in the data circulating through storage 104, the keyboard flag exists in the C position in the A register 106 at this time, namely, at P3, bit time 2, and clock B. Therefore, a sampling at this time and at this position in the A register determines whether or not a keyboard flag exists in any particular column.

Assuming that the machine is, for example, in an advanced column condition such as column 4, in which case the column indicator 128 indicates a visual "4," and the operator desires to backspace to column 3, he depresses the field erase key 164 setting the backspace latch 136 as just described. The system then scans storage 104 for keyboard flags starting with column 1, since the backspace latch 136 is set at column 1 time; and the first keyboard flag will be in column 4 and in position P3, bit time D. During the searching operation by the system and particularly by the AND circuit 228, the contents of the column counter 124, which increases from the digit "1" upwardly, are loaded into the B register 116 which acts as a storage device for the contents of the counter 124. This loading is due to the gating action of the AND circuit 190.

Since the backspace latch 136 is set as just described, its output, which is the "backspace latch" signal on lead 218, is applied to the AND circuit 242; and the AND circuit 242 also has the "PU" and "bit time 2" signals applied to it by means of leads 238 and 234. Therefore, at column 1, PU, bit time 2, the AND circuit 242 will have all of its inputs satisfied; and it therefore applies a signal on lead 246.

This signal on lead 246 causes a setting of the "load B REG" latch 150 and the provision of a signal on the output lead 252 of this latch. The inputs to the AND circuit 254 are thus both satisfied at PU, bit time 8, and column 1, since the input lead 258 to the latch 254 carries the "bit time 8" signal. At this time, the AND circuit 254 applies a signal to the B REG reset lead 260 which is connected to the B register 116 to reset the B register. The AND circuit 256 is satisfied a short time later at column 1, PU, bit time B, since the lead 262, constituting an input to the AND circuit 256, carries the "bit time B" timing signal; and the AND circuit 256, at this time, provides the signal "load B REG" on lead 264 connected to AND circuit 190. The AND circuit 190 at this time then gates the contents of the column counter 124 (which is the digit "1" ) to the B register 116. The column indicator 128 is connected to the B register 116 to indicate visually the contents of the B register 116; however, since the B register is very rapidly updated to have the digit "2" in it as will be described, actually the digit "1" does not appear to the operator on the column indicator 128. The load B REG latch 150 is reset at bit time C; so, therefore, the AND circuits 254 and 256 are disenabled very shortly after causing the AND circuit 190 to gate the contents of the column counter 124 to the B register 116.

The AND circuit 220, as will be described, is operative to stop the scanning of storage 104 and the updating of the B register 116 and column indicator 128. However, one of the inputs to the AND circuit 220 is the signal "keyboard flag" in the lead 226, and this signal does not appear until an actual flag is located. None exists in column 1; and, therefore, the storage scanning operation continues.

There is no keyboard flag existing in column 2 in the specific case above described; and, therefore, the AND circuit 228 does not provide a "keyboard flag" signal in lead 226 at this time. The AND circuit 242, however, is operative to update the B register 116 from the column counter 124; and, at column 2, the B register 116 thus contains the digit "2." The same operation continues for column 3, and the B register 116 contains the digit "3" at this time.

Since the system is originally in column 4 prior to depression of the field erase key 164, a keyboard flag exists in column 4, particularly at bit position D, P3, and column 4, in the data circulating through storage 104 and A register 106. Therefore, at column 4, P3, bit time 2, and clock B, there will be a bit at the A register C position; and the AND circuit 228 thus supplies a "keyboard flag" signal at this time in lead 226. The backspace latch 136 is set; so, therefore, the two inputs to AND circuit 220 are satisfied. A set signal is thus supplied to the backspace compare latch 144 through OR circuit 224; and the backspace compare latch 144 is set to provide a "-backspace compare latch" signal in lead 216. The signal "-backspace compare latch" in lead 216 is applied on AND circuit 212 along with the "keyboard" signal in lead 214 so as to provide a signal in lead 210, and the signal in lead 210 is applied through OR circuit 206 to reset the backspace latch 136. Therefore, since no signal now exists in the output lead 218 from the backspace latch 136, the AND circuit 242 is not now operative for gating the output of the column counter 124 through AND circuit 190; and, therefore, an address for the next column (column 4) will not be transferred to the B register 116 to cause a further updating of the column indicator 128. Thus, the last address stored in the B register 116 is column 3; and this is effective for registering a visual "3" in the column indicator 128.

At this time, the memory pass from column 3 is completed, with respect to the information circulating in storage 104, through column 96, and back into column 1; and the system now examines storage 104 for a compare between the B register 116 and the column counter 124. The purpose of this compare operation is to write a keyboard flag in column 3 (which will be at the D position in character P3) that will, in effect, condition the complete system for column 3.

The backspace compare latch 144 was set at P3, bit time 2, and clock B of column 4; and the column counter 124 at that time contained the "4" digit, while the B register contains the "3" digit as just described. Therefore, there is no compare at this time. However, in column 3 of the next memory pass after setting of the backspace compare latch 144 took place, the column counter 124 contains the digit "3"; and the "column counter compare" signal will be provided in lead 272 by the column counter compare logic 126 which has the contents of the column counter 124 and the B register effective on it through the leads 276 and 278. The AND circuit 284 has the signals "column counter compare" and "backspace compare latch" as inputs from leads 272 and 216, respectively; and, therefore, the AND circuit 284 is satisfied and provides a signal through OR circuit 288 to lead 292. With a signal being thus applied to lead 292, the AND circuit 294 is satisfied at P3, bit time D; and a bit or keyboard flag will therefore be written in bit D of character P3 of column 3. At this time, the register 116 contains the digit "3"; the column indicator shows a "3" digit; and there is also a keyboard flag existing in column 3. So, therefore, insofar as all machine functions and logic is concerned, the system now is in column 3. Therefore, when any of the data keys 154 are depressed at this time, the data will be entered into column 3 rather than into column 4, the column effective prior to the backspace operation. Data is not actually erased from column 3 during the foregoing operation; however, the erasing of the previous data in column 3 occurs when new data is entered into that column. Actually, in the backspace operation, it is only necessary, as before described, to write a keyboard flag back into storage in the preceding column and backdate the column indicator 128.

The "column counter compare" signal in lead 272 has another effect, namely, that of resetting the backspace compare latch 144. The "column counter compare" signal in lead 272, along with "PU" and "bit 1 & clock B" signals supplied in leads 272 and 274, are applied on AND circuit 270 so as to supply a signal through lead 268 and OR circuit 266 to reset the backspace compare latch 272 thereby completing the backspace operation, It will be noted that the resetting of the backspace compare latch 144 occurs at PU, bit time 1, and clock B which is subsequent to the time at which the keyboard flag was written.

When the operator desires to provide a record erase operation, in which all or a part of the 96 columns of data are erased insofar as the machine functions are concerned, the record erase switch 308, which may be located on the machine at some point spaced from the keys of the keyboard 100, is closed. It will be assumed initially that the program switch 204 is open. Basically, the record erase function puts the machine into its column 1 condition, in which the column indicator 128 indicates the digit "1," particularly by writing keyboard flags (in character P3, bit D) in all of the 96 columns of data circulating through storage 104 from column 1 to and including column 96.

As hereinbefore mentioned, the lead 310 connected with the record erase switch 308 is connected to the keyboard control logic 102; and the connection is such that the logic 102 will provide a "keyboard sample 2" pulse when the switch 308 is closed. As before mentioned, the "keyboard sample 2" pulse is a one-time pulse and occurs at column 1, P1, bit time 4. The "keyboard sample 2" pulse is supplied to lead 194 connected to AND circuit 312; and, therefore, with the switch 308 closed, both inputs of the AND circuit 312 are satisfied and a signal is produced in lead 408. The signal in lead 408 is effective through OR circuit 318 for setting the write keyboard flags latch 146.

The write keyboard flags latch 146 when set supplies a signal through lead 290, OR circuit 288, and lead 292 to AND circuit 294. The AND circuit 294 has three inputs, and the other two are by means of leads 232 and 296 respectively having the signals "P3" and "bit time D" thereon which occur for each column passing through storage 104. A signal occurring at P3, bit time D, for each column of data, is thus supplied through lead 298 and OR circuit 176 to lead 178 in the data circulating circuit including storage 104; and, therefore, a bit or keyboard flag is thus written in every column of data circulating through storage 104 starting with column 1, since the write keyboard flags latch 146 is set in column 1 due to the effect of the "keyboard sample 2" signal.

Keyboard flags are thus written for each of the 96 columns; and at column 96, PU, bit time 2, the write keyboard flags latch 146 is reset. The three signals, "column 96," "PU," and "bit time 2," are respectively supplied to the AND circuit 324 by means of leads 240, 238, and 234; and the AND circuit 324 thus provides a signal through lead 322 and OR circuit 320 on the reset side of latch 146 to reset the latch 146 and stop its action in writing keyboard flags in the circulating data loop including storage 104.

The writing of keyboard flags in all 96 columns starting from column 1 has been above described. It may be pointed out that if, instead of doing a record erase (by closing switch 308) when the machine is in other than column 96, for example, with the machine being in column 20, keyboard flags will be written in columns 1 through 20; and, in addition, the system is operative to rewrite keyboard flags in the remaining columns 21 through 96. The end result, however, is that there is a keyboard flag in each of the 96 columns even though keyboard flags were written on top of keyboard flags already existing in columns 21 through 96.

During the record erase operation, the AND circuit 326 has the effect of causing, along with other circuitry, the updating of the column indicator 128 so that it exhibits a "1" to correspond to the existence of the keyboard flags in all 96 columns of data circulating through storage 104. When the write keyboard flags latch 146 is set as before described, the AND circuit 326 has all of its required output signals supplied at column 96, KBD, and bit 2 times. The AND circuit 326 is connected with the leads 240, 214, 234, and 334 for this purpose. It will be noted that all of the required input signals to the AND circuit 326 are thus supplied at a time prior to the time of resetting the write keyboard flags latch 146, since the "PU" signal is effective to reset the latch 146, particularly by means of the AND circuit 324. The AND circuit 326 thus supplies a signal through lead 328 at column 96, KBD, bit time 2; and this signal is transmitted through OR circuit 330 to the set side of restore latch 152.

The restore latch 152 thus is set and supplies a signal through lead 344 to AND circuit 346 on the set side of recycle latch 148. The other inputs to the AND circuit 346 are from leads 240 and 348 having the signals "column 96" and "PR" thereon; and, therefore, the recycle latch 148 is set at column 96 and PR times. The restore latch 152 thus effectively operates to store the request that the recycle latch 148 is to be set at column 96, PR time.

The recycle latch 148 thus supplies the signal "recycle latch" to lead 304. The AND circuit 300 has the leads 274, 388, 304, and 302 as inputs; and these leads respectively carry the signals "bit time 1 & clock B," "not field erase latch," "recycle latch," and "P1." The field erase latch 132 at this time is in its reset condition; and, therefore, the signal "not field erase latch" exists in lead 306. Therefore, while the recycle latch 148 remains set and at every PL time for every column of data passing through storage 104, the AND circuit 300 is satisfied and provides a signal on lead 264 applied to AND circuit 190 by means of OR circuit 244, lead 246, load B REG latch 150, and AND circuit 254 and its output 264. The action of the OR circuit 244 in causing an updating of the B register and column indicator 128 is similar to the action of the OR circuit 244 as previously described. Thus, the AND circuit 190 will have its inputs satisfied at P1 time for every column of data passing through storage 104 and will transfer the contents of the column counter 124 to the B register 116. The recycle latch 148 effectively is set at the beginning of column 1 passing through memory 104 since the signals "PR" and "column 96" are applied onto the AND circuit 346 on the set side of recycle latch 148. So, therefore, at column 1, P1 (the signal "P1" is supplied to AND circuit 300 for this purpose), the AND circuit 190 will be effective to load the contents of the column counter 124 into the B register 116. Therefore, the digit "1," which corresponds to this digit contained in the column counter 124 and B register 116, is indicated on the column indicator 128.

The recycle latch 148 is reset a short time after being set while the machine is still in column 1, namely, at column 1, P3, bit time 2, and clock B by means of the signal supplied from AND circuit 228 through lead 226 and through OR circuit 350 onto the reset side of the recycle latch 148. As previously described, the lead 226 contains the signal "keyboard flag" derived from the AND circuit 228 at P3, bit time 2, clock B, in column 1 assuming that a keyboard flag is encountered. Since the recycle latch 148 is reset at column 1 time, the AND circuit 190 ceases to be effective to transfer data from the column counter 124 to the B register 116; and, therefore, the B register 116 contains the digit "1" which is registered on the column indicator 128. The record erase operation has thus been completed.

In the event that the program switch 204 is closed when the record erase operation takes place, the "recycle latch" signal in lead 304 also has the effect of updating the program control logic 114 so that program control logic 114 will be essentially in its first-column condition. As has been previously described, the program control logic 114 contains various program control latches and circuitry to put the various programs into effect; and, therefore, when the program switch 204 is closed to render the program logic effective, the program control logic 114 is and should be so updated. The "recycle latch" signal in lead 304 is supplied through OR circuit 356 and lead 358 to the program control logic 114 for this purpose. In the event that, in column 1, the program effective at the time includes an auto skip or an auto dup function, the program will immediately take over control and will cause an auto skipping or an auto duping to occur up to the end of the field for which the auto skipping or auto duping is effective. The B bits in characters P1, P2, P4, and P3 may, for each of the four programs (P1, P2, P4 and P3), indicate that the particular column having the end of field bits therein constitutes the end of a field for controlling the program operation accordingly. A field, incidentally, is a group of characters in a complete record; and the record, in this case, consists of 96 columns to correspond, for example, to a document card having 96 columns.

A field erase function is provided by the field erase latch 132 and associated circuitry; and the latch 132 is set by depression of the field erase key 164 under the conditions in which the program switch 204 is closed and in which the lower shift key 160 remains unactuated. The field erase function is for the purpose of returning the machine to the first column of the field in which the machine is presently operating or for returning the machine to the first column of the preceding field, assuming that the machine is in the first column of a field when the field erase key is depressed. Each field in a complete record is defined at its end with an end of field bit B (see FIG. 2) in the particular program in which the machine is operating by virtue of the actuation of one of the program keys 158.

Let it be assumed, for the purpose of providing a specific example, that the machine is operating in column 20; and, therefore, the digit "20" appears on the column indicator 128. Let it also be assumed that the operator desires to erase to column 10 by means of the field erase function using the field erase key 164, column 10 being the first column of the field in which the machine is presently operating (an end of field bit B is located in column 9).

With the program switch 204 being closed and with the field erase key 164 being actuated, the field erase latch 132 is set at keyboard sample 2 time. It will be noted that the AND circuit 370 on the set side of the field erase latch 132 has the three leads 202, 196, and 194 as inputs; and these leads respectively carry the signals "program switch on," "field erase key," and "keyboard sample 2." As has been previously mentioned, the "keyboard sample 2" signal is a pulse that occurs only once, namely, at column 1, P1, bit time 4.

The AND circuit 370 in addition to setting the latch 132, also generates the signal "set field erase" in lead 332 and this signal is supplied by means of this lead to OR circuit 330 on the set side of the restore latch 152. The restore latch 152 is thus set and provides the "restore latch" signal on lead 344 which is applied to AND circuit 346 on the set side of recycle latch 148. Nearly one complete memory cycle later, the recycle latch 148 is set, this occurring at column 96, PR time. It will be noted that the AND circuit 346 on the set side of the recycle latch 148 has the three inputs from leads 348, 240, and 344 which respectively carry the "PR," "column 96," and "restore latch" signals. With the recycle latch 148 set, the system will begin loading into the column indicator the addresses of certain columns contained in column counter 124; and this action is obtained by virtue of AND circuit 390.

The AND circuit 390 has the signals from the eight leads 378, 340, 232, 234, 236, 392, 396, and 398 thereon; and these leads respectively carry the signals "field erase latch," "recycle latch," "P3," "bit time 2," "clock B," "not A REG C bit," "first column latch," and "not auto skip or dup." The "field erase latch" signal in lead 378 is supplied when the field erase latch 132 is set; and the signals in leads 232, 234, and 236 are supplied respectively at P3, bit time 2, and clock B times. The signal "recycle latch" is supplied when the recycle latch 148 is set as just mentioned. The signal "not A REG C bit" is supplied from the inverter 394 connected to the lead 230 and is present in lead 392 except when a bit is present in the keyboard flag position C of the A register 106 at P3, bit time 2, and clock B times. The signal "first column latch" in lead 396 is derived from the program control logic 114 which is so constructed that this signal exists when the machine is in the first column of a field and does not exist when the machine is in any other column. As previously mentioned, the fields are determined by the end of field bits B located in the particular program P1, P2, P4, and P3 which is in effect by virtue of the actuation of one of the program keys 158. The signal "not auto skip or dup" on lead 398 is provided by the program control logic 114 and indicates that the machine is not operating in an auto field such as an auto skip or dup field.

The AND circuit 390 functions to scan the data circulating through storage 104 and particularly data in the A register 106 for the absence of a keyboard flag in a first column of a field; and the system functions, whenever a first column of a field is located, to transfer an address from the column counter 124 to the B register 116 as will be described. As has been previously mentioned, keyboard flags are erased on the entry of data in any particular column; and, therefore, the first keyboard flag located in the data circulating through storage 104, for the particular example given, is in column 20.

Each time the AND circuit 390 is satisfied by the eight signals previously mentioned, it provides a signal in its output lead 400 to OR circuit 244 which thus supplies a signal in lead 246 and on the set side of latch 150; and this latch is effective on the B register 116 as described above in connection with the backspace and record erase operations to satisfy the AND circuit 190 and allow the transfer of the digit contained by the column counter 124 to the B register 116 so that this digit is indicated by the column indicator 128. The AND circuit 390, together with the connected circuitry just mentioned, thus transfers an address to the B register 116 from the column counter 124 for every first column of a field in the particular example mentioned. The first column located will be column 1; and the next column that will be located is column 10, both being defined by end of field bits B in the program that is effective at the time. Scanning of the A register 106 by means of the AND circuit 390 does not start until column 1 since the "recycle latch" signal input to the AND circuit 390 is not provided by the recycle latch 148 until column 96, PR time.

In the event that a field has been programmed as an auto skip or dup field, the AND circuit 390 is not operative in such a field; and the field erase function would not return the machine to its first column condition of the auto dup or skip field but would rather return the machine to the first column of the first manual field preceding the auto dup or skip field.

Since the machine, before actuation of the field erase key 164, has been effectively in column 20 in the particular example given, there is a keyboard flag in this column located at bit D in character P3. The keyboard flag, and in particular the signal "keyboard flag" in lead 226, has the effect of resetting the recycle latch 148. The keyboard flag is found at P3, bit time 2, and clock B so that the AND circuit 228 is satisfied and provides the signal "keyboard flag" in lead 226. The OR circuit 350 on the reset side of the recycle latch 148 has the lead 226 applied to it as an input; and, therefore, the recycle latch 148 is reset at this time (in column 20). The B register, therefore, continues to retain the column 10 address; and the digit "10" remains on the column indicator 128.

The field erase latch 132 at this time has the effect of setting the field erase compare latch 138. It will be noted that the AND circuit 380 on the set side of the field erase compare latch 138 has the inputs from leads 382, 240, 348, 234, and 378 thereon. The leads 240, 348, and 234 respectively have the timing signals "column 96," "PR," and "bit time 2" thereon. The lead 382 has the signal "not recycle latch" thereon which is raised on a resetting of the recycle latch 148. The lead 378 carries the signal "field erase latch" from the field erase latch 132 which is in a set condition.

Therefore, after the completion of the second memory pass at column 96 after the field erase latch 132 has been set, the field erase compare latch 138 is set. Thereupon, the field erase latch 132 is reset; and this occurs at PR, bit time C, due to the action of AND circuit 376. The field erase compare latch, when set, provides the signal "field erase compare" in lead 404 connected with AND circuit 376 for this purpose.

With the field erase compare latch 138 being set, starting every P3, bit time 2, column 1, the AND circuit 402 causes the column counter compare logic 126 to be effective to sense a compare between the column counter 124 and the B register 116. This can only occur at column 10, in the example given, because the column 10 address is the address that is loaded in the B register. When there is thus a compare in column 10 at P3, bit time 2, the write keyboard flags latch 146 will be set, this action being by virtue of AND circuit 402.

It will be noted that AND circuit 402 has four inputs, two of these being from leads 232 and 234 carrying the timing signals "P3" and "bit time 2." The other two inputs are from leads 404 and 272 that respectively carry the signal "field erase compare" from field erase compare latch 138 when set and the signal "column counter compare" which is present in lead 272 when there is a compare in compare logic 126 as just mentioned. The AND circuit 402 provides a signal through lead 406 and OR circuit 318 in write keyboard flags latch 146; and therefore, write keyboard flags latch 146 is set under these conditions.

The write keyboard flags latch 146 is effective through lead 290, OR circuit 288, and AND circuit 294 to write keyboard flags at bit position C of character P3 of successive columns of data as has been previously described. In this particular case, this circuitry including the write keyboard flags latch 146 is effective to write keyboard flags starting in column 10 and is effective to the end of the record in column 96. It will be recalled that, for record erase, this circuitry was effective to write keyboard flags starting with column 1.

After flags have been written in columns 10 to 96 of the data circulating through storage 104, the restore latch 152 will be set by virtue of the operation of AND circuit 326. As will be noted, this has the "write keyboard flags" signal in lead 290 and the timing signals "column 96," "keyboard," and "bit time 2" from leads 240, 214, and 234 applied to it. The AND circuit 326 thus applies a signal through lead 328 and OR circuit 330 to set the restore latch 152 at this time.

The recycle latch 148 has the signals "restore latch" from lead 344 and the timing signals "column 96" and "PR" applied to it from leads 240 and 348; and the recycle latch is set at this time. The signal "recycle latch" thus appears on lead 304; and this signal is effective through AND circuit 300, OR circuit 244, lead 246, latch 150, AND circuit 256, and lead 264 to cause the column indicator 128 to be updated, this being identical to the updating action of the load B REG latch 150 previously described. The end result is that column 10 will again be indicated on the column indicator 128.

The "recycle latch" signal on lead 304 is also effective through OR circuit 356 and lead 358 on the program control logic 114, and the control logic 114 will thus be updated with the program data for column 10 so that the program data in that column is effective for controlling the machine.

The word erase function of the machine may be obtained by actuating the field erase key 164 after the lower shift key 160 has been actuated. It is assumed that the machine is under program control and that the program switch 204 is closed. The word erase action of the machine has the effect of erasing a word which has its first letter or character immediately following a blank space in memory, with the blanks being located between the word and the preceding word (a word is defined as any group of characters separated by other groups by at least one space or by the fact that it starts in the first column of a field or ends in the last column of a field). The name "JOHN SMITH" may, for example, be considered to be two words; and entry may, for example, be made of the first letter "J" in column 22 which forms the first column of a field, an end of field bit B being in column 21 in the particular program in effect. The operator will enter the letters J–O–H–N serially in columns 22, 23, 24, and 25 and then will depress the space bar 156 to provide a blank or space in column 26. The operator will then attempt to serially enter the letters S–M–I–T–H in the succeeding columns; but, assuming that a mistake is made, the letter "H" is entered in column 30 rather than the letter "T.". After actuating the lower shift key 160 and then actuating the field erase key 164, the machine, instead of going back to the first column of the field (column 22), will erase back to the column that contains the first significant character after the last space that was entered which, in the particular example given, would be column 27 since the space is in column 26. The operator may then rekey the word "SMITH" beginning with the "S" in column 27. In the event that there are no blanks in the field in which the erase is initiated, in this case, the system will simply perform a field erase as above described putting the machine back in the first column of the field.

With the program switch 204 being closed, the lower shift key 160 being depressed, and the field erase switch 164 being depressed, the word erase latch 134 will be set. The AND circuit 410 on the set side of the latch 134 has the same three inputs as the AND circuit 370 on the field erase latch 132 and, in addition, has the input from lead 412 carrying the "lower shift key" signal which is supplied when the lower shift key 160 is depressed. The three signals supplied to both the AND circuit 370 and the AND circuit 410 are "keyboard sample 2," "field erase," and "program switch on" signals respectively in leads 194, 196, and 202. When the four signals are thus supplied to the AND circuit 410, the word erase latch 134 is set at keyboard sample 2 time. The field erase latch 132 is also set, since the three input leads to the AND circuit 370 have signals on them.

The field erase latch 132 provides the "set field erase" signal on lead 332, and this is effective to set the restore latch 152 by means of the AND circuit 326, similarly as in the field erase operation. The "restore latch" signal on lead 344 then sets the recycle latch 148 at column 96, PR time as in the field erase operation.

In the word erase operation, the AND circuit 390 which was used in field erase, has two functions, namely that of defining the first column of a field; and in addition, it is operative to cause the transfer of the first column of every field to the B register. For the latter purpose, the signal "recycle latch" provided on lead 304 by setting of the recycle latch 148 is applied onto the AND circuit 390. The AND circuit 390 is then operative to cause a scanning of storage 104 for keyboard flags; and this occurs beginning with the first column since the latch 132 is set at column 1 time by the "keyboard sample 2" signal and since the AND circuit 390 has the signal "first column latch" thereon which is supplied by the program control logic 114 only in the first column of a field. The AND circuit 390 has all of its inputs satisfied at this time, at P3, bit time 2, and clock B, with no keyboard flag being present in column 1 whereby lead 392 has a signal on it. There is no keyboard flag present in column 1 at this time, since data has been entered into column 1 and succeeding columns. Thus at column 1, under these conditions, AND circuit 390 provides a signal on lead 400 that is applied through OR circuit 244 and lead 246 on latch 150. The latch 150 is operative to provide a signal through AND circuit 256 and lead 264 on AND circuit 190; and, therefore, the digit "1" is transferred from the column counter 124 to the B register 116.

The program control logic 114, at the next first column of a field occurring at column 10 in the particular example given, provides the next signal on lead 396; and the AND circuit 390 is then again operative in the same manner to cause a transfer of the digit "10" from the column counter 124 to the B register 116. Likewise, at column 22, which is the first column of the following field, the digit "22" is transferred to the B register 116 under the control of the AND circuit 390.

The AND circuit 390 at the time all of its inputs are satisfied, is operative to set the word erase field latch 140 due to the output from the AND circuit 390 in lead 400. The setting of the word erase field latch 140 is thus indicative of the first column of a field; and the word erase field latch 140 is operative under these conditions to cause a scanning of the entry register compare logic 112, particularly in conjunction with the AND circuit 426. The AND circuit 426 has inputs from the word erase latch 134 and the word erase field latch 140, which are both set, and it also has the timed inputs bit time 1 & clock B and keyboard from the leads 274 and 214. The fifth input to the AND circuit 426 is the signal "entry register compare," and this signal is provided on the lead 428 when the contents of the A register 106 and the entry register 110 are the same.

As has been previously described, when data is entered into the system by means of the keyboard 100, it is entered into the entry register 110 through buss 166, and the data is gated by means of AND circuit 450 and buss 452 into the data circulation system including storage 104 and A register 106. In every case of data entered from the keyboard 100, the data is entered into the keyboard character corresponding to the column in which the machine is operating.

When the field erase key 164 is depressed, the entry register 110 is reset by means of the "keyboard sample 1" pulse applied through lead 364, OR circuit 366, and lead 368 to the entry register 110. This is a pulse that occurs at bit time 2 of column 1, P1, times. The entry register is blank at this time; and, therefore, a compare can only occur when the A register 106 is blank. The latter may occur several times between columns 1 and 22; but since the field of interest exists, starting in column 22, its effects only in this field will be considered.

It will be noted that the word erase field latch 140 is reset by the signal "set first column latch" in lead 422. The program control logic 114 is effective for providing this signal just before the system enters a new field; and, therefore, the word erase field latch 140 is reset each time that, and just before, the AND circuit 390 is satisfied.

In the example given, there will be a compare between the contents of the entry register 110, which is blank, and the A register 104 at column 26, since column 26 in the example given separates the words "JOHN SMITH," data for which is disposed in columns 22 to 25 inclusive and columns 27 to 31 inclusive. In column 26, therefore, in this example, the inputs to the AND circuit 426 are satisfied at bit time 1, keyboard time; and the word erase space latch 142 is set. Since the "-keyboard" signal is supplied to the AND circuit 426 as an input, the actual compare is made at keyboard time, when a keyboard character is located in the A register, this being in view of the fact that the entry of all data into the circulating data passing through storage 104 is in the keyboard characters.

With the word erase space latch 142 being set, AND circuit 432 is effective to transfer an address from the column counter 124 to the B register 116 at the next column which contains a character rather than being blank. In the particular example given, the next nonblank column is column 27; and the digit "27" will be loaded from the column counter 124 to the B register 116. The AND circuit 432 is effective for this purpose acting through OR circuit 244, latch 150, AND circuit 256, and AND circuit 190 as previously described. The condition of column 27 as containing a character is applied on to the AND circuit 432 for this purpose by virtue of the fact that there is no compare for this column in the compare logic 112; and, therefore, there is no signal on lead 428, so that there is a "not entry register compare" signal at this time on lead 434 applied to OR circuit 432 as an input.

At the time that the latch 150 is effective to update the B register 116 and therefore also the column indicator 128 so that both contain the digit "27," the "B REG reset" signal raises in lead 260; and this signal is effective through OR circuit 438 to reset the word erase space latch 142 so that it is not subsequently effective to update the B register 116 and column indicator 128.

At this point in time, keyboard flags are rewritten similarly as in a field erase operation. There is a compare between the contents of the column counter 124 and B register 116; and since both have the digit "27" therein, the "column counter compare" signal is supplied through lead 272 to AND circuit 402. The AND circuit, functioning with the write keyboard flags latch 146, causes the writing of keyboard flags in every column starting with column 27 through column 96. This involves a setting of the recycle latch 148, and the output signal from this latch also has the effect of updating the program control logic 114 to thereby end the word erase operation. Data may then be entered into storage 104 in the same manner as before, namely, by utilizing the data keys 154. Since the machine is now effectively in its column 27 condition, the whole word "SMITH" in the example given may be rekeyed; and, therefore, columns 27, 28, 29, 30, and 31 now contain the corrected word.

The key-entry system advantageously functions to allow a single-column backspace with respect to the data circulating through storage 104 by actuating the field erase key 164 under the condition in which the program switch 204 is open. In the event that a field erase is desired, the same field erase key 164 is operative to effectively erase back to the first column of a field, assuming that the program switch 204 is closed and that the lower shift key 160 is not actuated. If the field erase switch 164 is actuated when the program switch 204 is closed and the lower shift key 160 is depressed; in this case, the system provides a word erase back to the first space in the particular field in which the system is operating.

What is claimed is:

1. A key-entry system including:
a keyboard having a plurality of data keys;
a data storage unit in which the data circulates in a closed path;
circuitry connecting said data keys and said storage unit so that, upon actuation of the data keys, data is put into position in the circulating data in said storage unit; and
selectively controlled means for rendering ineffective the data provided in said circulating storage system by actuation of one or more of said data keys so that corrected data can be entered in place of data originally provided in said storage unit by said data keys, said system including means for writing keyboard flag bits in the data circulating in said data storage unit, said circuitry connecting said data keys and said storage unit also being effective for erasing one of said flag bits for each of the data keys as it is actuated, said selectively controlled means including circuitry effective for rewriting the flag bits so as to render ineffective the data provided by actuation of one or more of said data keys, said selectively controlled means including means for scanning the data circulating through said data storage unit to determine the position of the first keyboard flag bit so as to thereby determine in which position a keyboard flag is to be so rewritten, said data storage unit including a magnetostrictive delay line and a shift register connected in series, and said scanning means including circuitry for determining the existence or nonexistence of a bit in a certain position in said shift register at a certain time.

2. A key-entry system according to claim 1, said keyboard also including a space key, said system including also a column indicator and controlling circuitry therefor so that the column indicator indicates visually the successive number of actuations of said keys.

3. A key-entry system according to claim 2, and including a register for storing the digit indicated visually by said column indicator and including also a column counter indicative of the position of any particular column of data circulating through said storage unit, said selectively controlled means including also means for updating said register and column counter and including also column counter compare logic for comparing the contents of said column counter and said register for ending the updating of said register and column counter so that said column indicator indicates the column to which the system has been backdated by rendering certain data ineffective as mentioned.

4. A key-entry system including:
a keyboard having a plurality of data keys;
a data storage unit;
circuitry connecting said data keys and said storage unit so that, upon actuation of a succession of the data keys, data is put into a first and successive positions in said storage unit; and
a record erase control effective on said circuitry in the storage unit so that, upon a stroke of the record erase control, the key-entry system returns to its original condition prior to the actuation of any of said data keys and data is entered into said first position of said storage unit due to the next actuation of one of said data keys.

5. A key-entry system according to claim 4, and including means for writing keyboard flag bits in successive positions of said data storage unit, said circuitry being arranged to erase the corresponding flag bit in each of said positions of said storage unit as data is entered into the particular position of said storage unit by actuation of one of said data keys, said record erase control being effective on said means for writing keyboard flag bits so as to rewrite keyboard flag bits in each of said positions from which the flag bits have been erased due to entry of data therein so as to put the key-entry system back to its original condition.

6. A key-entry system including:
a keyboard having a plurality of data keys;
a data storage unit;
circuitry connecting said data keys and said storage unit so that, upon actuation of a succession of said data keys, data is put into successive positions in said storage unit, one of said positions of said storage unit being adapted to contain a marker bit; and
a control effective on said circuitry for rendering ineffective the data provided in the positions of said storage unit subsequent to the position of the storage unit containing said marker bit for thereby putting the key-entry system back in its condition in which the actuation of a said data key will cause the entry of data in the next following position of said storage unit subsequent to that containing said marker bit.

7. A key-entry system according to claim 6, and including means for writing keyboard flag bits in said storage positions in said data storage unit, said circuitry connecting said data keys and said storage unit being effective for erasing the corresponding keyboard flag bit in the storage position in said storage unit into which data is entered upon actuation of each of said data keys, said control being effective on said means for writing keyboard flag bits so as to cause the flag bits to be reinserted into said positions in said storage unit following the storage unit position containing said marker bit.

8. A key-entry system including:
a keyboard having a plurality of data keys;
a data storage unit;
circuitry connecting said data keys and said storage unit so that, upon actuation of a succession of said data keys, data is put into successive positions in said storage unit, said data keys including a space key which when actuated causes no data to be entered into the storage position in said storage unit corresponding to the space key and which is connected to said circuitry to cause the key-entry system to be updated so that the following actuation of any of the other data keys causes data to be entered into the next successive storage position which corresponds to the last-mentioned other data key; and a control effective on said circuitry for effectively returning the condition of the key-entry system to its condition in which data will be entered into the storage position of said storage unit just following the position of the storage unit in which no data has been entered due to actuation of said space key.

9. A key-entry system according to claim 8, and including means for writing keyboard flag bits in said storage positions of said data storage unit, said circuitry connecting said data keys and said storage unit being effective for erasing the keyboard flag bits in the positions of said storage unit into which data is entered upon actuation of said data keys, said control being effectively connected with said means for writing keyboard flag bits so as to rewrite flag bits in the particular ones of said positions in said storage unit in which data has been previously entered by actuation of data keys and which follow the position of said storage unit containing no data by virtue of actuation of said space key.

10. A key-entry system including:

a keyboard having a plurality of data keys;

a data storage unit;

means for writing keyboard flag bits in successive column positions in said data storage unit;

circuitry connecting said data keys and said storage unit so that, upon actuation of a data key, data is entered into a column position in the storage unit which contains a keyboard flag bit, said circuitry connecting said data keys and said storage unit being effective for erasing the keyboard flag bit in the column in said storage unit for the data key which is actuated; and selectively controlled means for rendering ineffective the data in said storage unit due to prior actuation of one or more of said data keys back to a certain preceding column position so that data can be entered in place of data due to actuation of said one or more data keys and including circuitry effective for rewriting the flag bits for said columns of data to be replaced so as to render ineffective the data provided by actuation of said one or more data keys.

11 A key-entry system including:

a keyboard having a plurality of data keys;

a data storage unit including a delay line and a shift register connected in a loop in which the data circulates in a closed path;

means for writing keyboard flag bits in column positions in the data circulating in the data storage unit and circuitry connecting said data keys and said storage unit so that, upon actuation of said data keys, data is entered into successive column positions in the circulating data containing keyboard flag bits, said circuitry connecting said data keys and said storage unit being effective for erasing the corresponding keyboard flag bit in the data column circulating in said path for the data key which is actuated; and selectively controlled means for rendering ineffective the data circulating in said loop due to prior actuation of one or more of said data keys back to a certain preceding column position in the circulating data so that data can be entered in place of data originally circulating in said loop due to actuation of said one or more data keys and including circuitry effective for rewriting the flag bits for said columns of data to be replaced so as to render ineffective the data provided by actuation of said one or more data keys.

12. A key-entry system according to claim 11, said selectively controlled means including means for scanning the data circulating in the data storage unit for the first keyboard flag and means for writing a keyboard flag in the column of circulating data just preceding the column in which the first keyboard flag is located for thereby effectively backspacing the key-entry system for one column.

13. A key-entry system according to claim 12, said scanning means for locating the first keyboard flag including an AND circuit which is connected to one of the sections of said shift register to determine if the keyboard flag bit is present at a particular time in this section of the register.

14. A key-entry system according to claim 13, said means for rewriting a keyboard flag in the preceding column including a register for containing the number of the column in which the key-entry system is presently operating, a column counter under clock control synchronized with the flow of data in said storage unit, compare logic for comparing the contents of said register and said column counter, a latch which is changed in state on the satisfying of said AND circuit by a keyboard flag, and an AND circuit responsive to the output of said compare logic and said latch for rewriting a keyboard flag in the column of the data circulating through the data storage unit for the preceding column to which a backspace is made.

15. A key-entry system according to claim 11, said selectively controlled means being so arranged as to cause said keyboard flag writing means to be effective for all of the columns of data circulating in said data storage unit so that the key-entry system effectively put into its first column condition wherein the actuation of a data key provides data in the first column position of the data circulating through the data storage unit.

16. A key-entry system according to claim 11, said data storage unit being capable of carrying marker bits in the column positions of the circulating data designating the ends and beginnings of fields of data circulating in the data storage unit and said selectively controlled means being under the control of said marker bits for rendering ineffective data circulating in said loop back to a certain preceding column position determined by one of said marker bits.

17. A key-entry system according to claim 16, said selectively controlled means including an AND circuit connected with a certain position of said shift register for scanning data passing through said register for the absence of a keyboard flag in the first column of a field of data circulating through said shift register.

18. A key-entry system according to claim 17, and further including a register connected with a column counter under clock control synchronized with the flow of data in said storage unit and being under the control of said AND circuit so that the AND circuit when satisfied causes a transfer of an address to said register from said column counter for each first column of a field of data circulating through said data storage unit, and comparison logic for sensing a compare between said counter and said register and controlling said means for writing keyboard flag bits so as to write said flag bits into the data circulating through said data storage unit subsequent to the column of data for which the comparison occurred.

19. A key-entry system according to claim 11, said selectively controlled means including a register having no data contents and comparison logic for comparing the data circulating in said data storage unit for locating a column in said data which is blank, said means for writing keyboard flag bits being under the control of said comparison logic for writing keyboard flag bits for the columns in said circulating data subsequent to the column of the circulating data which is blank.

20. A key-entry system according to claim 19, said data storage unit being capable of carrying marker bits in the column positions of circulating data designating the ends and beginnings of fields of data circulating in the data storage unit, said selectively controlled means also including an AND circuit connected with a certain position of said shift register for scanning data passing through said register for the absence of a keyboard flag in the first column of a field of data circulating through the shift register and controlling said comparison logic so that the logic is not effective except for a column position in said circulating data which is blank in the particular field in which the blank is located.

21. A key-entry system according to claim 20, and further including a register connected with a column counter under clock control synchronized with the flow of data in said storage unit and being under the control of said AND circuit so that the AND circuit when satisfied causes a transfer of an address to said register from said column counter for each first column of a field of data circulating through said data storage unit, and additional comparison logic for sensing a compare between said counter and said register and also controlling said means for writing keyboard flag bits so as to write said flag bits into the data circulating through said data storage unit subsequent to the column of data for which the comparison occurred.

Disclaimer 3,602,897.—*John J. Igel*, Rochester, and *Myron D. Schettl*, Oronoco, Minn. KEY-ENTRY SYSTEM. Patent dated Aug. 31, 1971. Disclaimer filed July 1, 1974, by the assignee, *International Business Machines Corporation.*

Hereby enters this disclaimer to claim 4 of said patent.

[*Official Gazette July 1, 1975.*]